(12) United States Patent
Backhouse et al.

(10) Patent No.: US 7,519,684 B2
(45) Date of Patent: Apr. 14, 2009

(54) EXTENSIBLE URI-PATTERN-BASED SERVLET REQUEST PROCESSING FRAMEWORK

(75) Inventors: Richard Andrew Backhouse, Apex, NC (US); Srinivas Hasti, Raleigh, NC (US); Scott Dilworth Johnson, Durham, NC (US); Arvind Srinivasan, Raleigh, NC (US); Kevin Edward Vaughan, Fuquay Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 940 days.

(21) Appl. No.: 10/951,489

(22) Filed: Sep. 28, 2004

(65) Prior Publication Data

US 2006/0085421 A1    Apr. 20, 2006

(51) Int. Cl.
*G06F 15/16* (2006.01)
(52) U.S. Cl. .................... 709/218; 709/201; 709/203; 709/219; 709/223; 717/101; 717/104; 717/117
(58) Field of Classification Search ................ 709/218, 709/219; 717/101, 104, 117
See application file for complete search history.

(56) References Cited

U.S. PATENT DOCUMENTS

| | | | | |
|---|---|---|---|---|
| 7,099,727 | B2 * | 8/2006 | Wu et al. .................... | 700/104 |
| 7,350,185 | B2 * | 3/2008 | Sparago et al. ............. | 717/101 |
| 2002/0184401 | A1 * | 12/2002 | Kadel et al. ................. | 719/315 |
| 2003/0110315 | A1 | 6/2003 | Upton ........................ | 709/328 |
| 2003/0135509 | A1 | 7/2003 | Davis et al. ................. | 707/100 |
| 2003/0154239 | A1 | 8/2003 | Davis et al. ................. | 709/201 |
| 2003/0226107 | A1 | 12/2003 | Pelegri-Llopart et al. ... | 715/513 |
| 2004/0015578 | A1 | 1/2004 | Karakashian et al. ....... | 709/223 |
| 2004/0064503 | A1 | 4/2004 | Karakashian et al. ....... | 709/203 |
| 2004/0078495 | A1 | 4/2004 | Mousseau et al. ............... | 710/1 |

OTHER PUBLICATIONS

Andrews, Mark,"Story of a Servlet:An Instant Tutorial", http://java.sun/jsp_utils/PrintPage.jsp?url+http%3A%2Fjava.sun.com%2Fproducts%2Fservlet%2Farticles, Aug. 2004.
IBM, "Building Java HTTP servlets", Aug. 2004.
Magelang Institute, "The Java Sevlet API", at http://java.sun.com/developer/onlineTraining/SErvlets/Fundamentals/servlets.html, Aug. 2004.

* cited by examiner

*Primary Examiner*—Yves Dalencourt
(74) *Attorney, Agent, or Firm*—Yee & Associates, P.C.; A. Bruce Clay

(57) ABSTRACT

Extensible URI-pattern-based servlet request processing frameworks process and respond to requests for resources sent over a network by client programs to application programs in multi-tiered data processing systems. An extension processor component, an improved web container; and an improved web application architecture form the framework. The extension processor component includes one or more extension processor factories, each of which generates a single type of extension processor to handle specific application components. Each extension processor is adapted to respond to a request having a declared pattern. The extension processor factory resides within the web container and provides a list of patterns for which it is responsible. The extension factory also instantiates an extension processor to respond to a request having a pattern that matches that extension processor's declared pattern. The improved web application includes a request mapper adapted to route a request having a particular pattern to the appropriate extension processor.

1 Claim, 4 Drawing Sheets

100 Two-tier client/server architecture

200 Two-tier Web architecture

300 Multi-tier client/server architecture

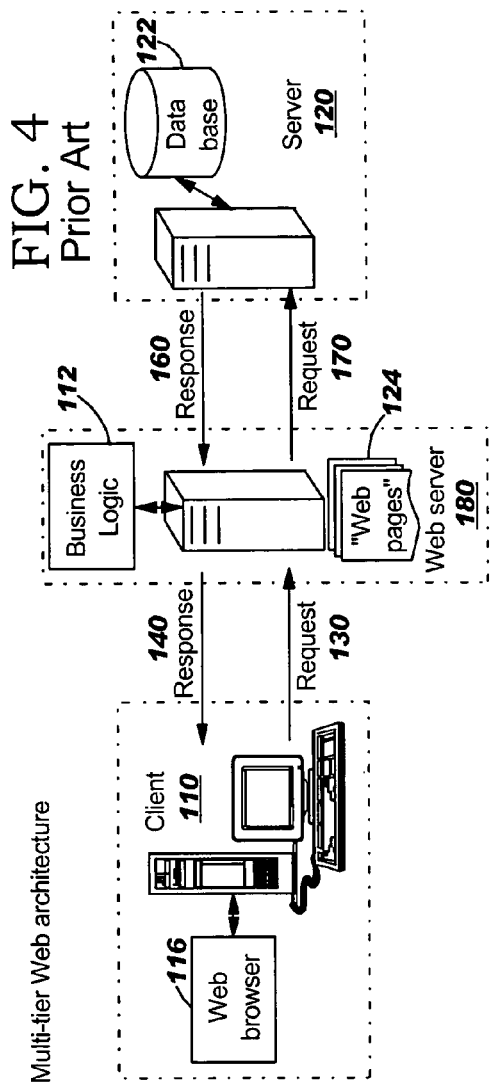
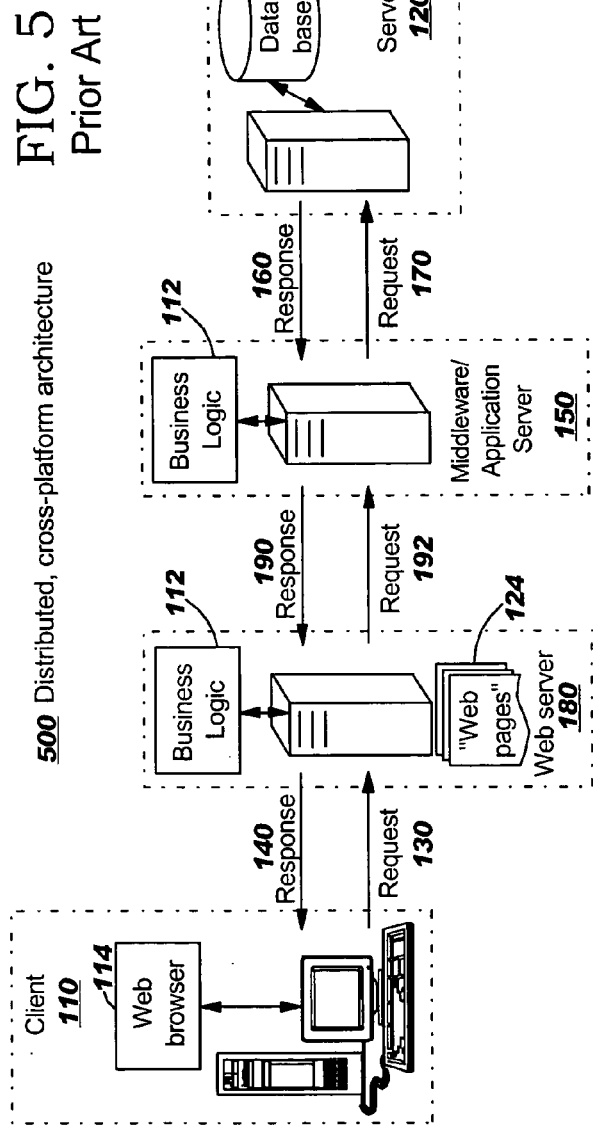

600 Java Server page extension processor component

700 Extensible URI-pattern-based servlet request processing framework

Runtime processing of client's request after extension processor has been instantiated by factory

EXTENSIBLE URI-PATTERN-BASED SERVLET REQUEST PROCESSING FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates to an extensible URI-pattern-based servlet request-processing framework for use in connection with digital data processing systems and functions for communicating between programs or processes. The extensible URI-pattern-based servlet request-processing framework has particular utility in connection with processing and responding to requests for resources sent over a network by client programs to application programs in a multi-tiered data processing system.

BACKGROUND OF THE INVENTION

Without question, the advent of the personal computer revolutionized enterprise computing during the 1980s, quickly distributing processing power throughout an enterprise. As the personal computer distributed processing power, though, it also tended to distribute critical data throughout the enterprise. The enterprise world soon realized that such unfettered data distribution was difficult to manage. Critical data often was lost as individual computers failed, and just as often, the same data maintained in separate computers was inconsistent or unsynchronized.

The evolution of the two-tier "client/server" architecture resolved some of this tension between the benefits of distributed processing and the detriments of distributed data. In a two-tier enterprise information system (EIS), a server tier stores and manages enterprise data, while a client tier provides a user interface to the data in the server tier, as illustrated in FIG. 1. A conventional client tier also is responsible for implementing most of the business logic or data processing. In general, a client and a server rely on a request/response model for communicating with each other, in which the client sends a request (for data or other resources) to a server, and the server responds to the client. Note that, in this context, the terms "client" and "server" refer to the hardware and software, collectively, that implement each tier's respective functions. The client, though, generally is a distinct physical entity that is remotely connected to the server through a network. FIG. 1 depicts a classic embodiment of the two-tier architecture, in which a client provides the user interface and business logic, and a database server maintains the enterprise data and processes a client's request to retrieve or update the data. More particularly, two-tier client/server architecture 100 has a server tier in the form of server 120 that stores and manages enterprise data stored in database 122. A client tier in the form of client 110 provides user interface 114 for viewing and manipulating data maintained by server 120. Client 110 is also responsible for implementing most of the business logic 112 required for data processing. Server 120 processes request 130 to retrieve or update the data in database 122 and sends response 140 to client 110.

Probably the most prolific example, though, of a tiered, client/server architecture is the World Wide Web ("the web"). Originally, the web comprised only two tiers—web servers and web clients (more commonly known as web "browsers"). FIG. 2 depicts the original web architecture, which is almost identical to the classic database architecture depicted in FIG. 1. In this case, however, user interface 114 is replaced by a web browser 116 and database 122 is replaced by web pages 124. Early incarnations of server 120 merely provided access to static web pages 124 by retrieving them and sending them over the network to the client 110, and the client 110 did nothing more than request and display them. Generally, though, web browser 116 may request any type of web resource that is available to server 120. Every web resource is associated with a Uniform Resource Indicator (URI), which uniquely identifies the resource. More particularly, web page's 124 URI identifies the location of server's 120 host, and the name and location of web page 124 within server's 120 file system. Consequently, web page's 124 URI is also known as a Uniform Resource Locator (URL). For example, the URL of a hypothetical web page 124 named "bar.html" in the "foo/" directory of web server 120 named "example.com" would be "example.com/foo/bar.html." Web browser 116 and the web server 120 adhere to the HyperText Transfer Protocol (HTTP), a standard network communication protocol, in order to exchange requests and responses over the network. Thus, the complete URI for the hypothetical "bar.html" web page 124 would be http://example.com/foo/bar.html.

Although the two-tier architecture has enjoyed much success over the years, sophisticated multi-tier client/server systems slowly have displaced this traditional model. As FIG. 3 illustrates, a multi-tier system such as multi-tier system 300 places at least one intermediate (or "middleware") component between client 110 and server 120. Generalized "n-tier" systems include n layers of software that provide a different layer of services at varying levels of detail to the layers above and beneath them, where n is any number. While client 110 tier generally retains its traditional responsibility for implementing user interface 114, one or more middle tiers implement business logic 112. A middleware component that implements business logic 112, as depicted in FIG. 3, commonly is referred to as an "application server." Additional tiers usually implement the traditional server 120 tier functions, which include data management and retrieval.

Web server technology continued to evolve as well, and eventually embraced techniques for dynamically generating web pages. These techniques allowed a web server to access enterprise data, usually through a database server, and to process the data before responding to a client's request, as FIG. 4 illustrates.

Clearly, there is some functional overlap between clients, web servers, application servers, and database servers, with each component exhibiting unique advantages. In particular, ubiquitous web browsers such as MOZILLA, NETSCAPE, and INTERNET EXPLORER provide inexpensive (if not free), cross-platform user interfaces that comply (usually) with standard formats (e.g. HTML) and protocols (e.g. HTTP). Similarly, web servers generally offer a cross-platform, standard-compliant means of communicating with the browsers; application servers provide cross-platform access to customized business logic; and database servers provide cross-platform access to enterprise data. Today, an EIS generally integrates each of these components, thus capturing the best of all worlds and providing an architecture for implementing distributed, cross-platform enterprise applications. FIG. 5 depicts one embodiment of a modern EIS, in which distributed, cross-platform web architecture 500 combines web server 180, application server 150, and server 120 to provide cross-platform access to customized business logic 112 and enterprise data stored in database 122.

Although the modern EIS provides an architecture for implementing distributed, cross-platform enterprise applications, historically, each EIS component has not been portable to other platforms (i.e. platform independent). In 1995, however, Sun Microsystems, Inc. ("SUN") introduced a new product, "JAVA," that provided the foundation for building such portable components. As introduced in 1995, JAVA comprised an object-oriented programming language and a processing architecture (the "JAVA virtual machine" or "JVM"). See David Flanagan, *Java in a Nutshell* 3 (3d ed. 1999). SUN touted JAVA as the only "write once, run anywhere" development tool, meaning that a developer could create a JAVA application and run it on any platform. Id. at 6. More accurately, though, JAVA allows a developer to create a JAVA application and run it on any platform having a JVM. Id. Several years later, SUN released a new JAVA specification, which included new language features and a new library of JAVA classes (the "JAVA platform") designed to support stand-alone application development. See James McGovern et al., *Java 2 Enterprise Edition* 1.4 *Bible* 5 (Wiley Publishing, Inc. 2003). SUN marketed this specification as JAVA 2 Standard Edition (J2SE). Id. Finally, in 1998, SUN released JAVA 2 Enterprise Edition (J2EE), which addressed the need for developing and deploying portable enterprise applications. Id. J2EE defines a standard multi-tier architecture for an EIS. Id. J2EE comprises a specification that defines the logical application components within an EIS, and defines the roles played in the development process. Id. All J2EE components run within a "container" program, which the J2EE specification also defines. Id. at 6. The components of a J2EE platform include application clients, applets, web components, and server components. Id.

A JAVA "servlet" is a type of J2EE web component that can perform the application processing assigned to a middle tier, act as a proxy for a client, and even augment the features of the middle tier by adding support for new protocols or other features. See generally MageLang Inst., The Java Servlet API, at http://java.sun.com/developer/onlineTraining/Servlets/Fundamentals/servlets.html (last visited Aug. 18, 2004). A servlet also can extend a web or application server's functionality and support dynamic generation of HTML documents. In this respect, a JAVA servlet is similar to native web server extension technologies such as Microsoft's ISAPI and ASP and Netscape's NSAPI. See, e.g., Clifford J. Berg, *Advanced Java 2 Development for Enterprise Applications* 604 (2d ed. 1999).

Like all J2EE components, a servlet runs within a container (sometimes also referred to as a servlet "engine"), which manages the servlet. The container loads and initializes the servlet, passes requests to the servlet and responses to a client, manages multiple instances of a servlet, and acts as a request dispatcher. The container also is responsible for destroying and unloading the servlet. For example, if the servlet's resources are needed elsewhere, the container destroys and unloads the servlet and then subsequently reloads and reinitializes the servlet if it is requested again. A servlet also is destroyed at the end of its useful life, and when the container shuts down. See Jeanne Murray, *Building Java HTTP Servlets* (September 2000), at https://www6.software.ibm.com/developerworks/education/j-servlets/j-servlets-ltr.-pdf (last visited Aug. 18, 2004). A container passes initialization information to a newly created servlet through a ServletConfig object. See, e.g., MageLang Inst., supra. While running, a servlet can get information about its environment (or "context") through a ServletContext object. Id.

In practice, a client sends a request to a server, which specifies a servlet's URI. The server, or more likely, a container running within the server, then creates an instance ("instantiates") of the servlet identified by the URI. The server or container also creates a thread for the servlet process. The servlet instance then stays active until the container explicitly destroys the servlet or the server shuts down. The container sends the request to the servlet, which processes the request and builds a response. The servlet dynamically constructs a response using information in the client request, and, if necessary, data from other EIS components. If the request uses HTTP, the servlet wraps the response in HTML. Finally, the servlet passes the response back to the client, through the container. Murray, supra.

Naturally, SUN provides a JAVA Servlet Application Programming Interface (API), which defines a standard interface between a client, container, and servlet. See, e.g., id. The JAVA Servlet API includes two packages, one that supports generic protocol-independent servlets (the "javax.servlet" package), and one that provides specific support for HTTP (the "javax.servlet.http" package). Id. Thus, a generic servlet must implement the javax.servlet.Servlet interface. Such generic servlets typically implement this interface by extending the javax.servlet.GenericServlet class, which is implemented in the javax.servlet package. A servlet that needs HTTP support (a "web servlet"), on the other hand, should extend the javax.servlet.http.HttpServlet class, which is implemented in the javax.servlet.http package. Almost all servlets written today are designed to use the HTTP protocol, so most servlets currently extend the javax.servlet.http.HttpServlet class. See Mark Andrews, *Story of a Servlet: An Instant Tutorial*, at http://java.sun.com/products/servlet/articles/tutorial/ (last visited Aug. 18, 2004).

The Servlet API generally provides support in four categories: (1) servlet life cycle management; (2) access to servlet context; (3) utility classes; and (4) HTTP-specific support classes. See, e.g., MageLang Inst., supra. A servlet and container communicate through the API methods, which include init(ServletConfig), and service(ServletRequest, ServletResponse). Id.

As noted above, a container instantiates and initializes a servlet the first time it is needed. To initialize the servlet, the container invokes the servlet's init( ) method, passing a ServletConfig object as an argument. The ServletConfig object includes a getServletContext( ) method that returns a ServletContext object, which represents the server's environment. Id. Generally, the init( ) method opens database or other server connections required to service a request. See, e.g., Murray, supra.

The service( ) method is the "heart" of the servlet. MageLang Inst., supra. A container invokes the service (ServletRequest, ServletResponse) method whenever a request invokes the servlet. Thus, each request message from a client results in a single call to the servlet's service( ) method. The service( ) method reads the request and produces the response message from its two parameters: a ServletRequest object, and a ServletResponse object. A ServletRequest object consists of name/value pairs of parameters and an InputStream. A ServletResponse object represents the servlet's reply back to the client. Id.

The Java Servlet API is a standard supported by many web servers, especially those that are bundled with application servers. Berg, supra, at 604. Thus, the Servlet API provides a very convenient and secure framework for creating distributed applications that can serve dynamically generated HTML, and also can access other network servers, such as databases and application servers. Id. Of course, to implement a distributed application with Java servlets, a web server must run a servlet container or an application server that has a servlet container capable of supporting the life cycle of servlets. McGovern et al., supra, at 78. A servlet container running within a web server is referred to generally as a "web container." Likewise, a distributed application that relies on web servlets is referred to generally as a "web application." Because web servlets plug into an existing server, they leverage a lot of existing code and technology. The server handles the network connections, protocol negotiation, class loading, and more. MageLang Inst., supra.

A JavaServer Page (JSP) is another type of J2EE web component that supports dynamic HTML generation. See, e.g., McGovern et al., supra, at 113. A JSP, in form, is similar to a static HTML document that contains embedded Java code. Id. at 7. Functionally, though, a JSP is nothing but a servlet that a container automatically generates from a file containing valid HTML and JSP tags. Id. at 115. The container interprets the JAVA code and incorporates any output that the code generates into the HTML content before returning the content to a client. Berg, supra, at 631. In practice, most JSP implementations compile portions of a JSP page into one or more runtime objects that can be cached for improved efficiency. Id.

Servlets have become an important adjunct to application servers by providing a web-traversable gateway. Many products extend application server features including security, transaction management, and load balancing to the servlet container, thereby allowing servlets to become the universal gateway to these services. Berg, supra, at 607. A "gateway" servlet, found in application servers such as Tomcat and JBoss, handle specific Uniform Resource Locator (URL) patterns and route requests for those URLs to their final destination (typically a client) after reading configuration information and initializing the target.

A gateway servlet, though, like all J2EE components, must run within a container. The container loads and initializes the servlet, passes requests to the servlet and responses to a client, manages multiple instances of a servlet, and acts as a request dispatcher. The container also destroys the servlet at the end of its useful life. Servlets are unloaded and removed from memory when the container shuts down. Consequently, the container may remove a gateway servlet at any time, which may decrease application performance and/or impose additional requirements in container design. Gateway servlets also must undergo the lifecycle of a servlet, which may adversely affect application performance as well. Moreover, the gateway servlet concept does not provide a convenient means for implementing a downstream container that can leverage any of the host container's optimizations.

While the above-described gateway servlets fulfill their respective, particular objectives and requirements, the aforementioned prior art does not describe an extensible URI-pattern-based servlet request-processing framework that allows processing and responding to requests for resources sent over a network by client programs to application programs in an EIS. The prior art makes no provision for providing gateway servlet functionality without being subjected to the constraints of traditional servlet design. Thus, there is a need in the art for an improved means of processing URI requests that overcomes the disadvantages of the current gateway servlet technology but still allows a developer to extend and customize a web application's functionality. Such an improved means also should reduce the execution path of any given request and handle most standard lifecycle events (such as J2EE security calls and class loading) and web container specific events. In this regard, the present invention substantially fulfills this need. In this respect, the extensible URI-pattern-based servlet request processing framework according to the present invention substantially departs from the conventional concepts and designs of the prior art, and in doing so provides an apparatus primarily developed for the purpose of processing and responding to requests for resources sent over a network by client programs to application programs in a multi-tiered data processing system.

SUMMARY OF THE INVENTION

The present invention is an improvement to generalized multi-tier computing systems, comprising an extensible URI-pattern-based servlet request processing framework and accompanying apparatuses and methods for using the framework, all of which overcome the above-mentioned disadvantages and drawbacks of the prior art. In particular, the inventive extensible URI-pattern-based servlet request processing framework essentially comprises an extension processor component, an improved web container, and an improved web application architecture. The extension processor component comprises one or more extension processor factories, each of which generates a single type of extension processor to handle specific application components. Each extension processor is adapted to respond to an HTTP request having a URI of a declared pattern. The extension processor factory resides within the web container, and is responsible for providing a list of URI patterns for which it is responsible. The extension factory also instantiates an extension processor to respond to a request having a URI that matches the extension processor's declared pattern. The improved web application includes a request mapper adapted to route an HTTP request having the declared URI pattern to the extension processor.

BRIEF DESCRIPTION OF THE DRAWINGS

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention. Such description makes reference to the annexed drawings wherein:

FIG. 4 is a schematic view of a prior art multi-tier web architecture;

FIG. 5 is a schematic view of a prior art distributed, cross-platform web architecture;

DETAILED DESCRIPTION OF THE PREFERRED EMBODIMENT

Figure 1:
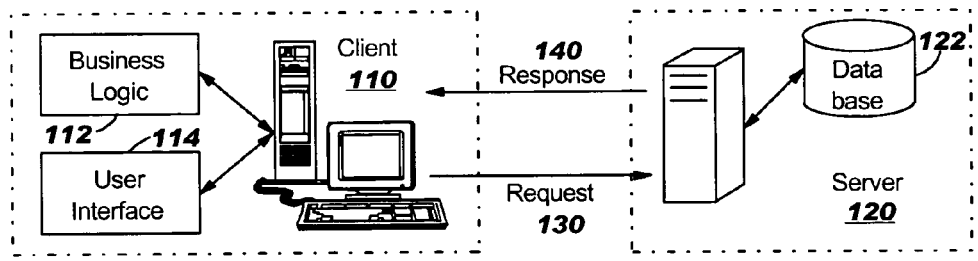
FIG. 1 is a schematic view of a prior art two-tier client/server architecture.
Figure 2:
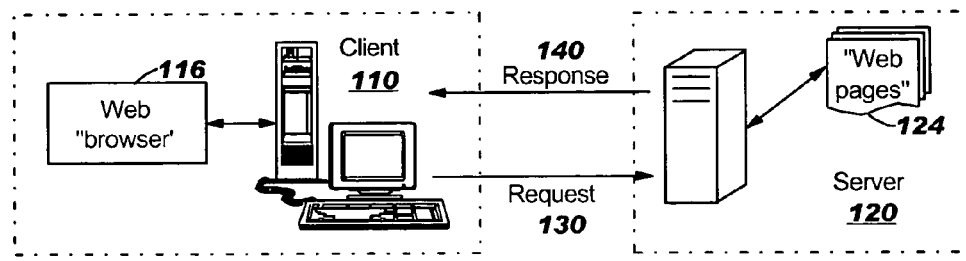
FIG. 2 is a schematic view of a prior art two-tier web architecture.
Figure 3:
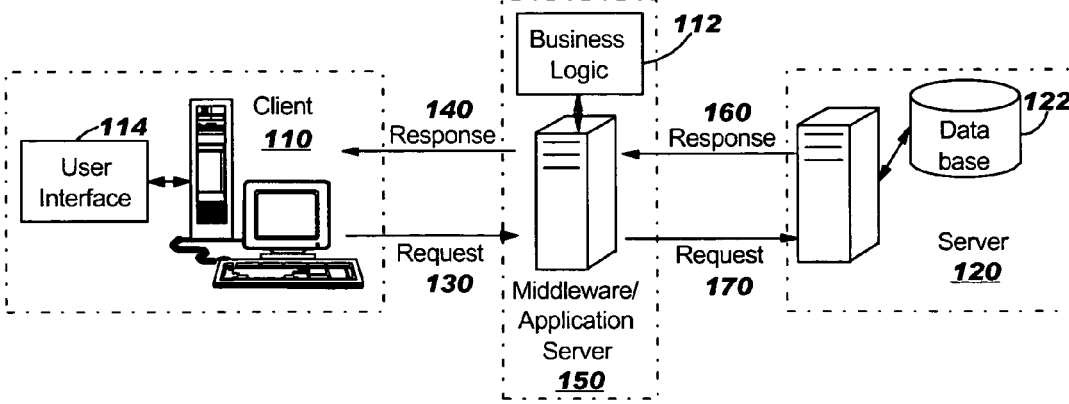
FIG. 3 is a schematic view of a prior art multi-tier client/server architecture.

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The present invention is described best, though, as an extensible framework for deploying and using network resources in an EIS. In general, the framework comprises an improved container program and at least one "extension processor factory" program, which furnishes an "extension processor" program to process a client's request for a network resource. An extension processor factory is typically a third-party component that is registered with the web container. When an application is installed in the web container, the application queries the extension processor factory for a list of URI patterns that its extension processors will be responsible for handling. Additionally, the application's configuration (ServletContext) is passed along to the factory during an extension processor's creation, so that the extension processor factory can tailor the new extension processor to the needs or characteristics of the application. The extension processor then is associated with a pattern in the extension processor factory's list of URI patterns, so that any incoming request matching any such pattern will get routed to the extension processor. A client must identify the network resource's URI in the request. Each extension processor program is adapted to process requests for a specific type of network resource, and the extension processor factory specifies a URI pattern that represents the type of network resource that each such extension processor is adapted to process. As used in this description, a "network resource" includes any static data, such as an HTML file or image, or any program operable to generate data dynamically, such as a servlet or JSP.

Referring now to the drawings, a current embodiment of the extensible URI-pattern-based servlet request-processing framework of the present invention is shown and generally designated by the reference numeral 700.

Figure 6:
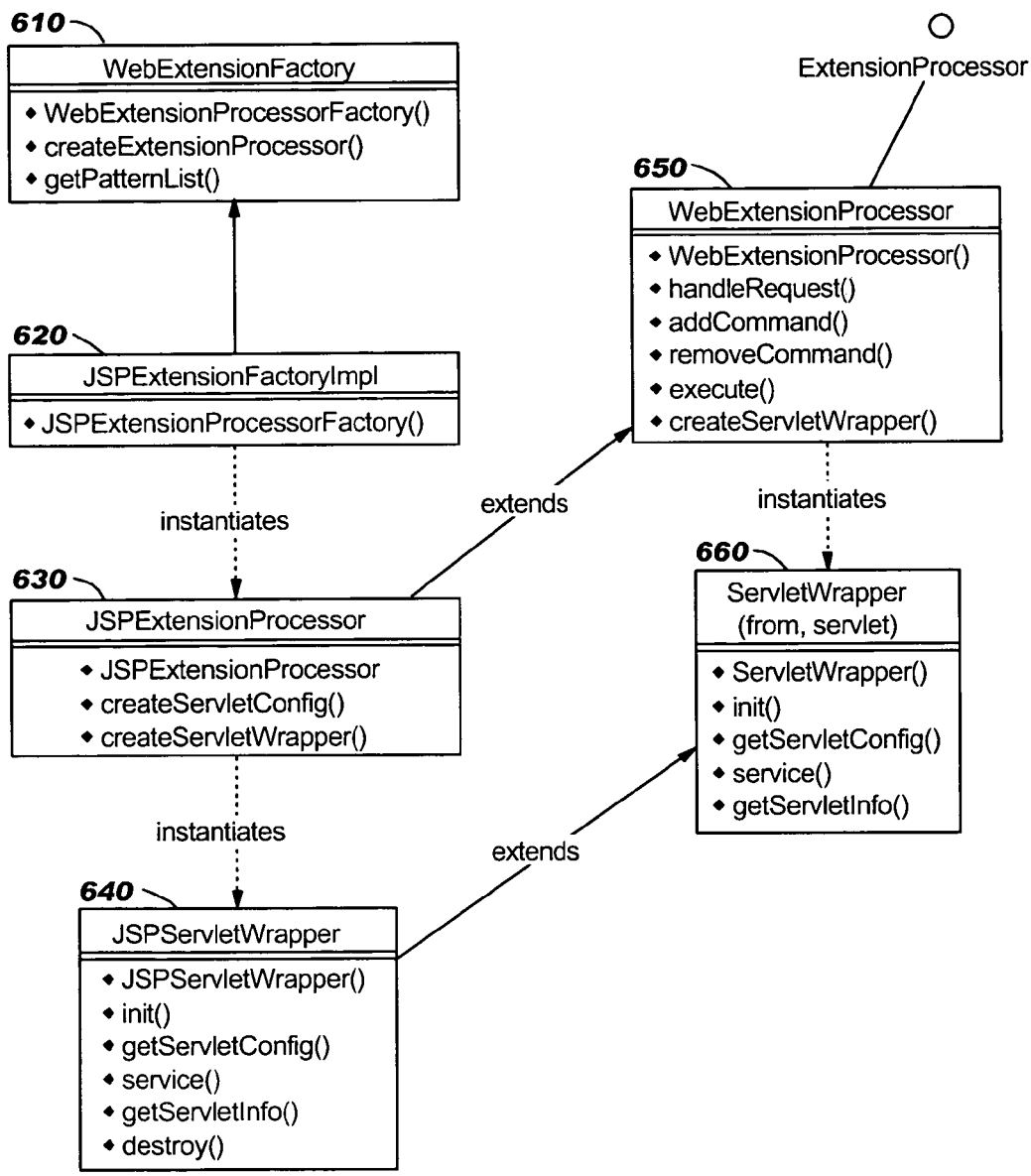
FIG. 6 is a class diagram view of the JavaServer Page extension processor component of the present invention.

FIG. 6 illustrates an implementation of extension processor component 600 adapted to process a request for a web component in a J2EE EIS. In particular, extension processor component 600 is adapted to process a request for a JavaServer Page (JSP). Extension processor component 600 is comprised of several JAVA classes, including web extension processor 650 and web extension processor factory 610. Web extension processor 650 is adapted to provide a default response to any request 130 that uses HTTP. Extension processor component 600 also includes JavaServer Page (JSP) extension processor 630 and JSP extension processor factory 620. JSP extension processor 630 extends web extension processor 650 and is adapted to process any request 130 that uses HTTP and specifies any pattern in the URI that indicates the requested resource is a JSP. In particular, JSP extension processor 630 is adapted to instantiate a ServletConfig object and JSP servlet wrapper 640, which extends servlet wrapper 660 and services the JSP request. Web extension processor factory 610 is adapted to maintain a list of all available extension processors and associated URI patterns, such as JSP extension processor 630, and to provide a list of all such extension processors upon request. JSP extension processor factory 620 extends web extension processor factory 610 and creates an instance of JSP extension processor, as needed, to process requests for JSPs.

The following code provides an example of how JSP extension processor 630, JSP extension factory 610, and web extension processor 650 are implemented:

```
ExtensionProcessor.java
package com.ibm.wsspi.webcontainer.extension;
import java.util.List;
import com.ibm.wsspi.webcontainer.RequestProcessor;
public interface ExtensionProcessor extends RequestProcessor
{
    public List getPatternList( );
}
ExtensionFactory.java
package com.ibm.wsspi.webcontainer.extension;
import java.util.List;
import com.ibm.wsspi.webcontainer.servlet.IServletContext;
public interface ExtensionFactory
{
    public ExtensionProcessor createExtensionProcessor(IServletContext webapp) throws Exception;
    public List getPatternList( );
}
WebExtensionProcessor.java
package com.ibm.wsspi.webcontainer.extension;
import java.util.ArrayList;
import java.util.List;
import javax.servlet.ServletException;
import javax.servlet.ServletRequest;
import javax.servlet.ServletResponse;
import javax.servlet.UnavailableException;
```

-continued

```
import com.ibm.ejs.ras.Tr;
import com.ibm.ejs.ras.TraceComponent;
import com.ibm.websphere.csi.J2EEName;
import com.ibm.websphere.csi.J2EENameFactory;
import com.ibm.ws.exception.RuntimeError;
import com.ibm.ws.exception.RuntimeWarning;
import com.ibm.wsspi.webcontainer.metadata.WebComponentMetaData;
import com.ibm.ws.webcontainer.metadata.WebComponentMetaDataImpl;
import com.ibm.ws.webcontainer.metadata.WebMetaDataFactory;
import com.ibm.wsspi.webcontainer.metadata.WebModuleMetaData;
import com.ibm.wsspi.webcontainer.servlet.IServletConfig;
import com.ibm.wsspi.webcontainer.servlet.IServletWrapper;
import com.ibm.ws.webcontainer.servlet.ServletWrapper;
import com.ibm.ws.webcontainer.webapp.WebApp;
import com.ibm.ws.webcontainer.webapp.WebAppConfiguration;
import com.ibm.wsspi.webcontainer.servlet.IServletContext;
/**
 *
 *
 *
 * A convenience implementation of the ExtensionProcessor interface. It provides default
 * implementations for the createServletWrapper( ) and createConfig( ) methods.
 *
 */
public abstract class WebExtensionProcessor implements ExtensionProcessor
{
    protected IServletContext extensionContext;
    private static J2EENameFactory j2eeNameFactory = WebApp.getJ2eeNameFactory( );
    private static TraceComponent tc = Tr.register(WebExtensionProcessor.class, "Webcontainer",
"com.ibm.ws.webcontainer.resources.Messages");
    /**
     * Sub classes of this class must call super( ) in their public constructor to
     * properly construct the WebExtensionProcessor.
     */
    public WebExtensionProcessor(IServletContext webApp)
    {
        this.extensionContext = webApp;
    }
    /**
     * This method will be called by the webcontainer to delegate the request processing
     * to this extension processor.
     * @param req
     * @param res
     */
    public abstract void handleRequest(ServletRequest req, ServletResponse res) throws Exception;
    /**
     * @return ServletWrapper
     */
    public IServletWrapper createServletWrapper(IServletConfig config) throws Exception
    {
        ServletWrapper wrapper = new ServletWrapper(extensionContext);
            try
            {
                wrapper.initialize(config);
            }
            catch (UnavailableException ue)
            {
            // Servlet will be unavailable but will still be added to the mapper
            // so as to throw the Unavaliable exception when invoked for service( )
                Tr.warning(tc, "Servlet "+config.getServletName( )+" is currently unavailable:
"+ue.getMessage( ));
                ue.printStackTrace(System.err);
            }
            catch (Throwable e)
            {
                // Might be more serious....so first log
                Tr.error(tc, "Error occurred while preparing the servlet for initialization.
Check the error logs for details.");
                e.printStackTrace(System.err);
            }
        return wrapper;
    }
        /**
         * Returns the list of patterns (as Strings) conforming with the servlet mappings
         * as mandated by the servlet spec. The subclasses of this class may override this
         * method in case they want to supply patterns they want to be associated with.
         */
```

-continued

```
    public List getPatternList( )
    {
        return new ArrayList( );
    }
    /**
     * A convenience method that creates a ServletConfig object. This also populates
     * the necessary metaData which enables the Servlet associated with the returned
     * config to correctly lookup NameSpace entries. It is highly recommended that
     * extension processors use this method to create the config objects for the targets
     * that the processor creates.
     *
     * @param servletName
     * @return
     * @throws ServletException
     */
    public IServletConfig createConfig(String servletName) throws ServletException
    {
        com.ibm.ws.webcontainer.servlet.ServletConfig sconfig = new
com.ibm.ws.webcontainer.servlet.ServletConfig(servletName);
        WebComponentMetaDataImpl cmd = null;
        try
        {
            WebAppConfiguration wconfig = ((WebApp)extensionContext).getConfiguration( );
            WebModuleMetaData mmd = wconfig.getMetaData( );
            J2EEName jname = j2eeNameFactory.create (mmd.getApplicationMetaData( ).getName( ),
mmd.getName( ), servletName);
            cmd = WebMetaDataFactory.createWebComponentMetaData(jname, mmd);
            cmd.setWebComponentType(WebComponentMetaData.SERVLET);
            cmd.setWebComponentVersion(" "+ (float)((float)wconfig.getVersion( )) / 10.0);
        } catch (RuntimeWarning warning)
        {
            com.ibm.ws.ffdc.FFDCFilter.processException(warning,
"com.ibm.ws.webcontainer.extension.WebExtensionProcessor.createConfig", "687", this);
        } catch (RuntimeError exception)
        {
            com.ibm.ws.ffdc.FFDCFilter.processException(exception,
"com.ibm.ws.webcontainer.webapp.WebAppServletManager.addServlet", "691", this);
            throw new ServletException(exception);
        }
        sconfig.setMetaData(cmd);
        cmd.setServletConfig(sconfig);
        return sconfig;
    }
}
```

Figure 7:
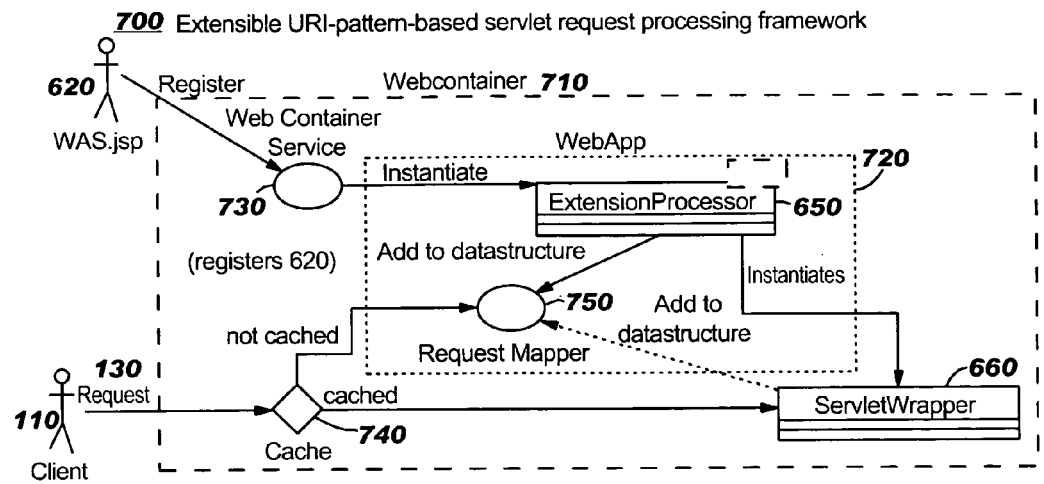
FIG. 7 is a schematic view of the extensible URI-pattern-based servlet request processing framework of the current invention.

FIG. 7 schematically represents an embodiment of the novel extensible processing framework 700 in a J2EE EIS. Extensible processing framework 700 includes improved web application 720, which runs in improved web container 710. Web container 710 and web application 720 interact with extension processor component 600 to process request 130 from client 110 that uses HTTP and indicates in the URI that the requested resource is a JSP. Improved web application 720 also includes request mapper 750 adapted to route request 130 to JSP extension processor 630, which extends web extension processor 650. As FIG. 7 illustrates, JSP extension processor factory 620 resides within web container 710 and provides a list of URI patterns for which it is responsible. To integrate extension processor component 600 and web container 710, extension processor component 600 first invokes web container's 710 WebContainerService 730 to register JSP extension processor factory 620. As web container 710 loads web application 720, it provides a list of available extension processor factories, such as JSP extension processor factory 620 to web application 720. Web application 720 then stores the patterns associated with each extension processor factory, and instantiates JSP extension processor 630 the first time client 110 requests a JSP.

At runtime, client 110 submits request 130 for a JSP over a network to a host using HTTP. The resource is identified by a URI. In this embodiment, web container 710 receives request 130 and routes the request to the appropriate target. Web container maintains internal cache 740 of recent requests 130 so that it can route repeated requests 130 directly to the target, which is JSP servlet wrapper 640 (an extension of servlet wrapper 660) in the current embodiment. If web container 710 has not cached request 130, it routes request 130 to web application 720. Thus, web container 710 routes request 130 directly to JSP servlet wrapper 640 when request's 130 pattern is cached, and indirectly routes request 130 to JSP servlet wrapper 640 through web application 720 when request's 130 pattern is not cached.

If web container 710 routes request 130 to web application 720, request mapper 750 compares the URI with URI patterns in its data structure and returns the appropriate extension processor 630 for that URI pattern. If, as in FIG. 7, client 110 has requested a JSP, then extension processor 650 creates an instance of JSP servlet wrapper 640. JSP servlet wrapper 640 then executes and generates response 140, which web application 720 and web container 710 route back to client 110.

Figure 8:
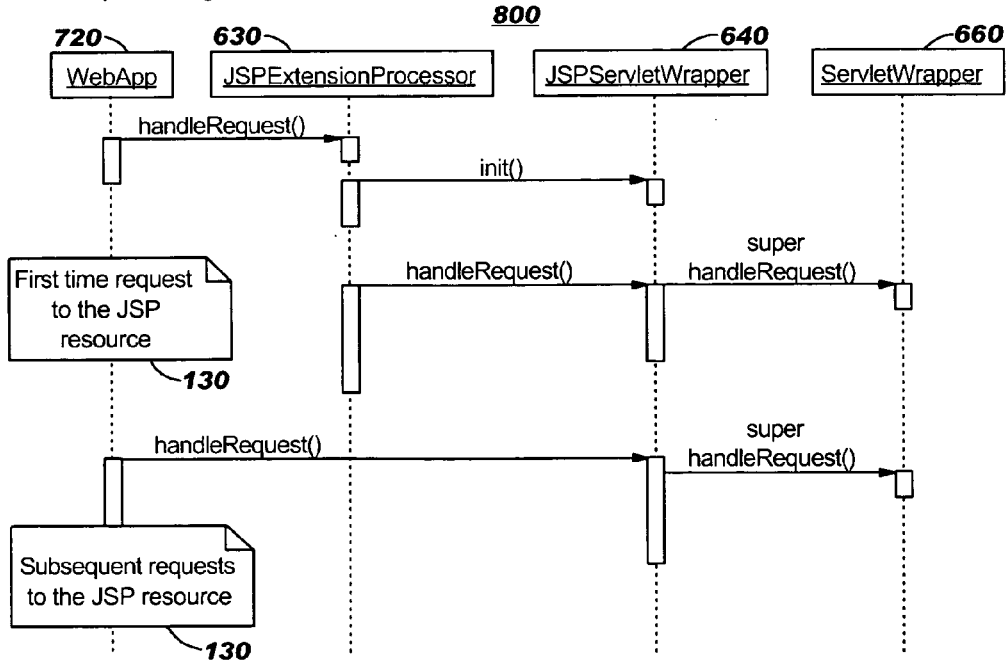
FIG. 8 is a flow diagram view of the runtime processing of a client's request after an extension processor has been instantiated by the extension processor factory of the present invention.

FIG. 8 further illustrates the runtime processing of request 130 after extension processor factory 620 has instantiated JSP extension processor 630. Web application 720 first calls JSP extension processor's 630 handleRequest( ) method in response to request 130. JSP extension processor 630 then creates a ServletConfig instance using web application's 720 context. JSP extension processor 630 then invokes JSP servlet wrapper's 640 init( ) method to create an instance of JSP servlet wrapper 640 using the ServletConfig instance, and adds newly created JSP servlet wrapper 640 instance to request mapper 750. JSP extension processor 630 then invokes JSP servlet wrapper's 640 handleRequest( ) method, which is responsible for translating the JSP, creating the class loader, loading the class, setting the target servlet, and invoking the handleRequest( ) method of servlet wrapper 660. The servlet wrapper 660 method also handles event dispatching, performance monitoring infrastructure, and manages the wrapped servlet's lifecycle. Subsequent requests 130 for the JSP resource may be routed directly to JSP servlet wrapper 640, which may reduce processing time significantly.

While a current embodiment of the extensible URI-pattern-based servlet request processing framework has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable transmission protocol may be used instead of the HTTP protocol described. Also, the servlet may also be an HTML document, an image, a JSP, or a portlet. Furthermore, a wide variety of identifying patterns may be used instead of the URI and URL described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method for creating an instance of an extension processor that handles a request from a client for a resource using hypertext transfer protocol, the request indicating in a uniform resource indicator (URI) that the resource is a java server page, the method comprising:

providing a list of patterns of URIs for which an extension processor factory is responsible;

loading a web application by a web container and providing a list of extension processor factories that are available to the web application by the web container;

storing the list of patterns of URIs of each extension processor factory in the list of extension processor factories by the web application;

routing the request to the web application;

by a request mapper within the web application, comparing the request's URI with the lists of patterns of URIs stored by the web application and returning an extension processor for the request based on a pattern of the URI of the request;

creating an instance of the extension processor by the extension processor factory the first time the client requests the resource;

creating an instance of a servlet wrapper by the instance of the extension processor;

adding the instance of the servlet wrapper to the request mapper; and routing subsequent requests for the resource directly to the servlet wrapper by the request mapper in the web application.

* * * * *